(12) United States Patent
Marshall

(10) Patent No.: US 6,738,104 B2
(45) Date of Patent: May 18, 2004

(54) ROBUST COLOR WHEEL PHASE ERROR METHOD FOR IMPROVED CHANNEL CHANGE RE-LOCK PERFORMANCE

(75) Inventor: Stephen W. Marshall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 414 days.

(21) Appl. No.: 09/792,206

(22) Filed: Feb. 23, 2001

(65) Prior Publication Data

US 2001/0043289 A1 Nov. 22, 2001

Related U.S. Application Data

(60) Provisional application No. 60/259,001, filed on Dec. 29, 2000, and provisional application No. 60/185,078, filed on Feb. 25, 2000.

(51) Int. Cl.⁷ ............................ H04N 9/31; H04N 9/475
(52) U.S. Cl. ...................... 348/743; 348/742; 348/771; 348/536; 348/270
(58) Field of Search ................................ 348/743, 742, 348/771, 759, 536, 537, 514, 524, 544, 547, 69, 70, 268, 269, 270; 353/84, 31; 345/690, 84; 358/512

(56) References Cited

U.S. PATENT DOCUMENTS

| | | | | |
|---|---|---|---|---|
| 5,365,283 A | * | 11/1994 | Doherty et al. | 348/743 |
| 5,528,317 A | * | 6/1996 | Gove et al. | 348/743 |
| 5,657,099 A | * | 8/1997 | Doherty et al. | 348/743 |
| 5,706,061 A | * | 1/1998 | Marshall et al. | 348/743 |
| 5,917,558 A | * | 6/1999 | Stanton | 348/743 |
| 5,967,636 A | * | 10/1999 | Stark et al. | 353/84 |

* cited by examiner

Primary Examiner—Michael H. Lee
Assistant Examiner—Jean W. Désir
(74) Attorney, Agent, or Firm—Charles A. Brill; Wade James Brady, III; Frederick J. Telecky, Jr.

(57) ABSTRACT

A new method for phase locking the color wheel in a color field-sequential projection display. At periodic interrupts, the method determines which color wheel index mark should be driven into coincidence with the Vsync signal. It does this by measuring the delay between Vsync and any index mark and then based on the current state of the spoke-sync counter and this delay value, a new next state is determined to drive the nearest index mark to Vsync to the Vsync position. At worst case this technique requires only one-half a color wheel revolution of phase correction to re-lock the system when the TV channel is changed and for the 5/2 and 7/2 spoke-sync modes, popular 50 Hz and 60 Hz modes, only one-quarter revolution of phase correction of the color wheel is required for re-lock.

20 Claims, 9 Drawing Sheets

ROBUST COLOR WHEEL PHASE ERROR METHOD FOR IMPROVED CHANNEL CHANGE RE-LOCK PERFORMANCE

This application claims priority under 35 USC §119(e)(1) of provisional application No. 60/259,001 filed Dec. 29, 2000 and provisional application No. 60/185,078 filed Feb. 25, 2000.

BACKGROUND OF THE INVENTION

1. Field of the Invention

The present invention relates to projection displays and more specifically to that of phase locking the color filter wheel in color field-sequential projection systems.

2. Description of the Related Art

The color wheel dynamics in conventional color field-sequential projectors typically are dampened to help mitigate artifacts caused by switching sequence codes as the speed of the color filter wheel changes. As a result, these projectors can be slow to lock-up at initial spin-up and/or when the channel is changed while operating in the TV mode. For example, a typical first-generation field-sequential Digital Micromirror Device™ (DMD™) projector has the following lock-up characteristics:

| | |
|---|---|
| Initial spin-up to lock | 10 seconds |
| Channel change re-lock | 4 seconds |

In earlier projectors, this was not so much of a problem since they were mostly used in graphics applications in which the displays were connected to computers displaying fixed images. When used to display television signals, however, where there are multiple channels of live video, waiting seconds for the color wheel to lock-up every time a channel is changed is undesirable.

FIG. 1 is a block diagram showing the color wheel synchronization controller in a micromirror projection display system. The controller may include a microprocessor ($\mu$P) 10, a motor controller and driver 11, a motor with attached color wheel 12, and an index sensor 13. The motor controller and driver circuitry 11 provide a drive signal to the motor and the controller receives a frequency feedback signal from the color wheel/motor assembly 12. The $\mu$P has two inputs; a Vsync signal and an index signal. The index signal is created by the index sensor 13 every time an index mark, located on the hub or rim of the color wheel, is observed. The $\mu$P has an internal free running timer for event timing. In operation, the occurrence of Vsync captures the timer value as Vsync_toa and generates a Vsync interrupt and the occurrence of an index captures the timer value as index_toa and generates an index interrupt. These captured values are then used to determine the difference between the index and Vsync signals as index_Vsync_difference=index_toa−Vsync_toa where toa is the time-of-arrival of the signals. This difference is used to maintain a desired track point by determining a phase_error, which is defined as phase_error=desired_phase_offset−index_Vsync_difference.

FIG. 2 is a drawing of a typical color wheel 20. The wheel may have six color filter segments; e.g., two red (R) filters 21,24, two green (G) filters 22,25, and two blue (B) filters 23,26. As white light is applied to the color wheel, a sequential red-green-blue-red-green-blue (R-G-B-R-G-B) filtered light beam is output to the spatial light modulator (SLM) each revolution of the color wheel. In addition, some projection systems use an eight-segment wheel, where two clear segments are included to give a sequential light pattern of R-G-B-W-R-G-B-W. An index mark 27 is also included on the wheel, as shown.

A set of projection display operating modes, called spoke-sync modes, are defined in terms of the number of index periods divided by the corresponding number of Vsync periods; i.e., spoke-sync mode=num_index_periods/num_Vsync_periods.

For example in the 5/2 mode (also called 2.5× mode) there are five index periods for every two Vsync periods. Several commonly used modes, along with the applications they are used in, are listed below:

| MODE | | APPLICATION |
|---|---|---|
| 4/2 mode | (2×mode) | Graphics |
| 5/2 mode | (2.5×mode) | 50 & 60 Hz Vsync |
| 6/2 mode | (3×mode) | 50 & 60 Hz Vsync |
| 7/2 mode | (3.5×mode) | 50 Hz Vsync |
| 6/1 mode | (6×mode) | 30 Hz Vsync |
| 7/1 mode | (7×mode) | 24 Hz Vsync |

A state counter is used to count the number of index marks over the designated number of Vsync periods for a particular spoke_sync mode. This counter counts from 0 to num_index_periods−1 and resets to zero or increments at the occurrence of each index interrupt. For example, for a 7/2 mode the state counter counts up to 6 (0 through 6) in two Vsync periods. However, since only one of these seven possible index mark occurrences is designated as the primary index mark to be aligned with Vsync, the worst case phase-lock correction can be as much as 1¾ of a wheel rotation, which requires approximately 14 seconds. This has not been a problem for most one-chip micromirror color field-sequential displays since they have been primarily used for stationary data display in which there is no motion in the image that can cause artifacts during re-lock. However, it is a problem for TV and movie displays where there is motion in the image. In this case, there is a need to minimize the phase-lock/re-lock time in order to limit the exposure to those temporal or motion artifacts caused by incorrectly swapping video buffers during the display period. When the color wheel is phase locked, the video buffer swapping occurs between display periods.

The following additional definitions are useful in understanding the color wheel phase-lock process in color field-sequential displays:

fixed_offset = minimum delay from *Vsync* to primary index

= phase_offset when spoke_sync_counter = 0

= approximately 50 $\mu$sec;

filtered_Vsync_period=long term average of Vsync period;

spoke_sync_offset=(filtered_Vsync_period *spoke_sync_counter*number_Vsync_periods)/number_index_periods, if spoke_Vsync_offset>filtered_Vsync_period then spoke_

Vsync_offset=spoke_sync_offset −filtered_Vsync_period;
for example, in the 5/2 mode:

| Spoke_sync_counter | Spoke_sync_offset |
|---|---|
| 0 | 0 |
| 1 | filtered_Vsync_per * 2/5 |
| 2 | filtered_Vsync_per * 4/5 |
| 3 | filtered_Vsync_per * 1/5 |
| 4 | filtered_Vsync_per * 3/5 | desired_phase_offset=fixed_offset+spoke_sync_offset;

index_Vsync difference=index_toa−Vsync_toa;

phase_error = desired_phase_offset − index_*Vsync*_difference,

= desired_phase_offset − index_*toa* + *Vsync_toa*.

In operation, the index_Vsync_difference is subtracted from the desired_phase_offset to determine the phase_error and then the loop corrects to drive the phase_error to zero, thus giving the desired_phase_offset. However, the problem in conventional sequential color projection system is that this correction takes too long and as a result produces temporal and color artifacts in the image.

FIG. 3 is a diagram showing the conditions, based on the above definitions, which exist in counter state 0. Included are the Vsync pulse 30, the index pulse 34, and the discriminator curve showing the phase_error 31 and desired track point 32. As shown, when the track_point comes in close proximity (approaches) with the Vsync pulse 30 the phase_error 31 goes positive at the desired_track_point 32. However, if the track_point crosses the Vsync pulse's 30 leading edge position, the previous Vsync_toa is then used in the index_Vsync difference (index_toa−Vsync_toa) calculation causing the calculated phase error to go highly negative rather than continuing in a positive direction. This leaves about 0.6% of a color wheel rotation for the circuit to correct the speed and lock at the desired_track_point 32. If the color wheel speed error is not zero before the phase error slips past the positive to highly negative transition (see FIG. 3), the speed will be adjusted to drive the negative phase error to zero, increasing the speed error. Therefore, this condition is called a quasi-stable track point.

A major problem with conventional approaches to phase locking the color wheel is that only one of the index marks (for example, 1 of 5 for the 5/2 mode) is designated to be aligned with the Vsync pulse and the state counter is free-running; e.g., counts from 0 to 4 and rolls over. This is illustrated in the 5/2 mode timing diagram of FIG. 4, which shows the Vsync pulse 40 and the index pulse 41. There is only one physical index mark on the color wheel, but the wheel rotates 5 revolutions in 2 Vsync periods. The fixed offset is that shown for state 0, or approximately 50 μSec. The Vsync period is shown divided into 5 equal segments (1–5). Depending on the counter state when a channel change occurs, the desired delay is as shown at the bottom of FIG. 4. For example, if the counter is at state 2, then the desired delay is ⅘*Vsync+fixed_offset, or if the counter is at state 3, then the desired delay is ⅕*Vsync+fixed_offset, relative to the alternate Vsync pulse.

The spoke_sync_counter chart shown earlier in Table 1 gives the conditions for each state.

FIG. 5*a* shows the raw discriminator curves for the five states in the 5/2 mode phase-sync system of FIG. 4 (arbitrary example). The desired delay is as follows:

| Curve | Desired Delay | |
|---|---|---|
| State 0 50 | 0 | |
| State 1 51 | 2/5 * Vsync + offset ♠ | (2/5 + OS) |
| State 2 52 | 4/5 * Vsync + offset ♠ | (4/5 + OS) |
| State 3 53 | 1/5 * Vsync + offset ♠ | (1/5 + OS) |
| State 4 54 | 3/5 * Vsync + offset ♠ | (3/5 + OS) |

If these five discriminator curves are overlaid on top of each other, an average discriminator output curve 55, as shown in FIG. 5*b*, results. FIG. 5*c* is an expanded view of this average curve showing the tracking points 56, which are a multiple series of quasi-stable points, as defined earlier in FIG. 3. This is not desirable since there is only a narrow tracking range on the order of 50 μsec in phase at each point.

The tracking stability can be improved in conventional systems by considerably limiting the discriminator count from the typical ±20,000 range of values to ±1024, as shown in FIG. 6*a*. This shows the limited discriminator curves for states 0 through 4 60–64. Also shown are the unlimited discriminator curves 600–604, as discussed in FIG. 5. FIG. 6*b* shows these five discriminator curves 60–64 aligned relative to their tracking points to yield the average unlimited discriminator curve 65 with its multiple quasi-stable tracking point 66 (blown up view in circle) and the average limited discriminator curve 67. The limited curve 67 has been scaled by 5× in order to more clearly show the details. As shown, this limited curve provides both an incorrectly positioned stable tracking point 68 and a correctly positioned quasi-stable tracking point 69.

Two approaches are typically used to provide stable tracking points in these systems. The first typical solution to this phase error problem is stated as follows:

1) When the calculated phase error is beyond reasonable limits (±1024), substitute the phase error calculated from a previous state 1 index occurrence, since state 1 occurs in all spoke-sync-modes.

The method is

When spoke_sync_counter=1, then saved phase_error= phase_error, and then if phase_$_{error<-}$_1024 or >+1024, then phase_error= saved_phase_error.

The result of solution 1 is shown in FIG. 7. FIG. 7*a* shows the five solution 1 limited discriminator curves 70–74 for states 0 through 4, respectively, for the 5/2 spoke-sync mode. Also, shown are the unlimited discriminator curves 700–704 for illustration purposes only. FIG. 7*b* shows the resulting average limited 75 and unlimited 76 discriminator curves, respectively. FIG. 7*c* shows that this results in a single stable track point 76.

2) The second typical solution to this phase error problem is stated as follows:

When an error condition exists, correct the phase error value by adding or subtracting the filtered_Vsync_ period to or from it, respectively.

The method is

If phase_error<−filtered_Vsync_period/2, then phase_ error=phase_error+filtered_Vsync_error or if phase_error>filtered_Vsync_period/2, then phase_ error=phase_error−filtered_Vsync_error.

The result of this solution 2 is shown in FIG. 8. FIG. 8*a* shows the five solution 1 limited discriminator curves 80–84 for states 0 through 4, respectively for a 5/2 spoke-sync mode. Also, shown are the unlimited discriminator curves 800–804 for illustration purposes only. FIG. 7b shows the resulting average limited 85 and unlimited 86 discriminator curves, respectively. FIG. 7c shows that this also results in a single stable track point 87.

These two color wheel phase_error correction techniques take advantage of the phase error calculated for each index mark in the case of small phase errors. The first solution substitutes a previously calculated phase error to correct the problem caused by positive phase errors that are greater than the fixed-offset. The second solution handles the problem by centering the track point for each index mark in the center of the discriminator curve. Although these two solutions solve the phase_error problem by providing stable track points, they can take a long time to lock-up and as a result are unacceptable in many TV display applications.

What is needed is a technique that can for all spoke-sync modes of operation, achieve an initial color wheel spin-up and phase-lock in less than 5 seconds and a color wheel channel change re-lock in less than 1 second. The invention disclosed herein meets these requirements. The two basic solutions discussed above are still used, but their speed is improved considerably by means of an innovative approach, which allows the spin-up and phase-lock requirements to be met.

SUMMARY OF THE INVENTION

This invention discloses a new technique for phase locking the color wheel in a color field-sequential projection system at both initial start-up and channel change re-lock. The disclosed method achieves initial color wheel spin-up and phase-lock in <5 seconds and channel change re-lock in <1 second for all spoke-sync modes of operation in a color field-sequential projection system.

The basic method comprises the following steps:
1. Calculate the phase error
2. Determine if loss of phase lock has occurred
3. Determine which index mark is nearest to Vsync and designate it as the primary index mark
4. Interrupt the state counter and set it so that the index mark nearest Vsync coincides with state 0
5. Re-calculate the phase error to drive the newly designated primary index mark into alignment with Vsync.

This approach assures that in the worst case the color wheel will rotate only ± one-half revolution before phase-lock occurs and for the 5/2 and 7/2 modes, phase-lock will occur in less that ± one-quarter revolution.

DETAILED DESCRIPTION

Figure 1:
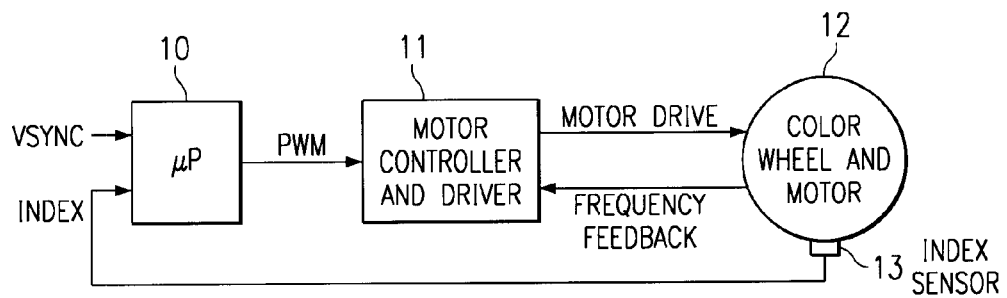
FIG. 1 is a top level block diagram for a sequential color projector's color wheel phase lock system. (prior art)
Figure 2:
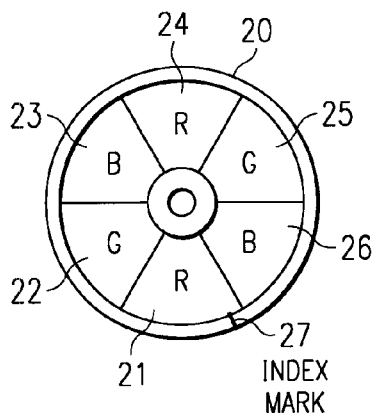
FIG. 2 is drawing of an RGB-RGB color filter wheel with one index mark that is typically used in color field-sequential projection systems. (prior art)
Figure 3:
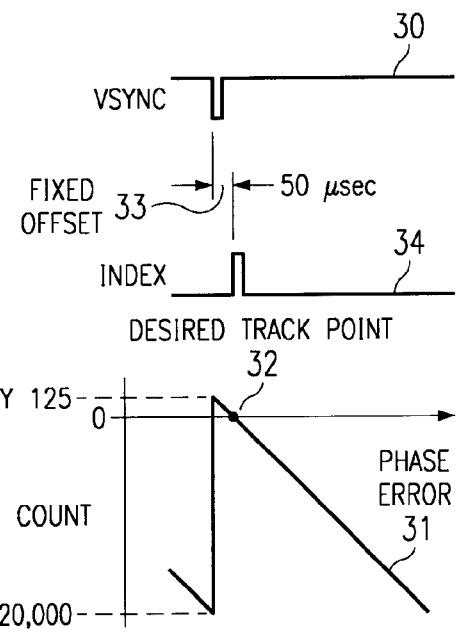
FIG. 3 is a diagram showing the tracking point on the phase loop's discriminator curve and its relation ship to the system's Vsync and Index marks. (prior art)
Figure 4:
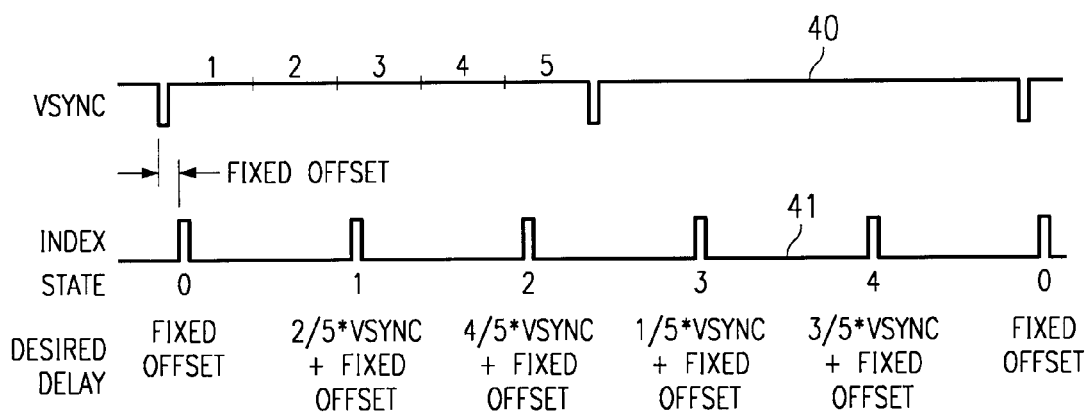
FIG. 4 is a timing diagram for a 5/2 mode color field-sequential projection system. (prior art)
Figure 5A:
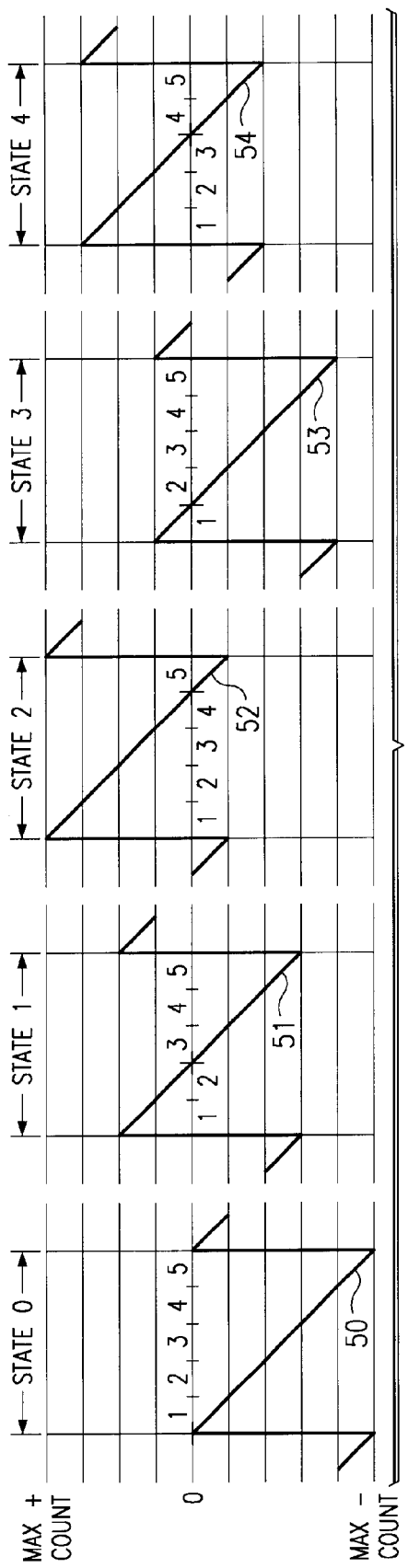
FIGS. 5a–5c are the raw discriminator curves for the color wheel's 5/2 mode of operation, showing the presence of multiple quasi-stable tracking points. (prior art)
Figure 5C:
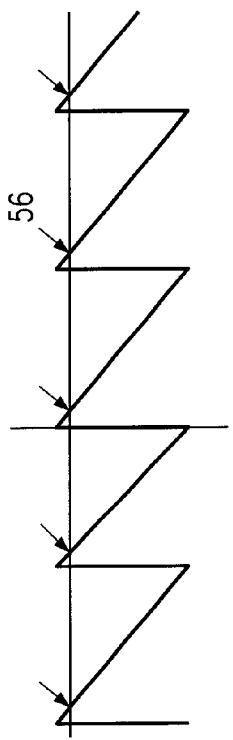
Figure 5B:
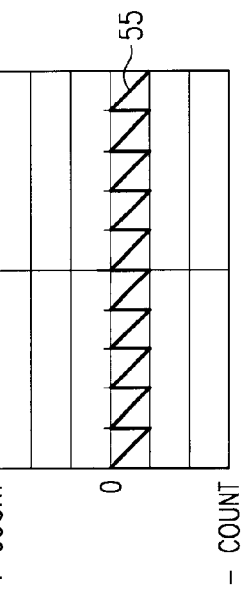
Figure 6A:
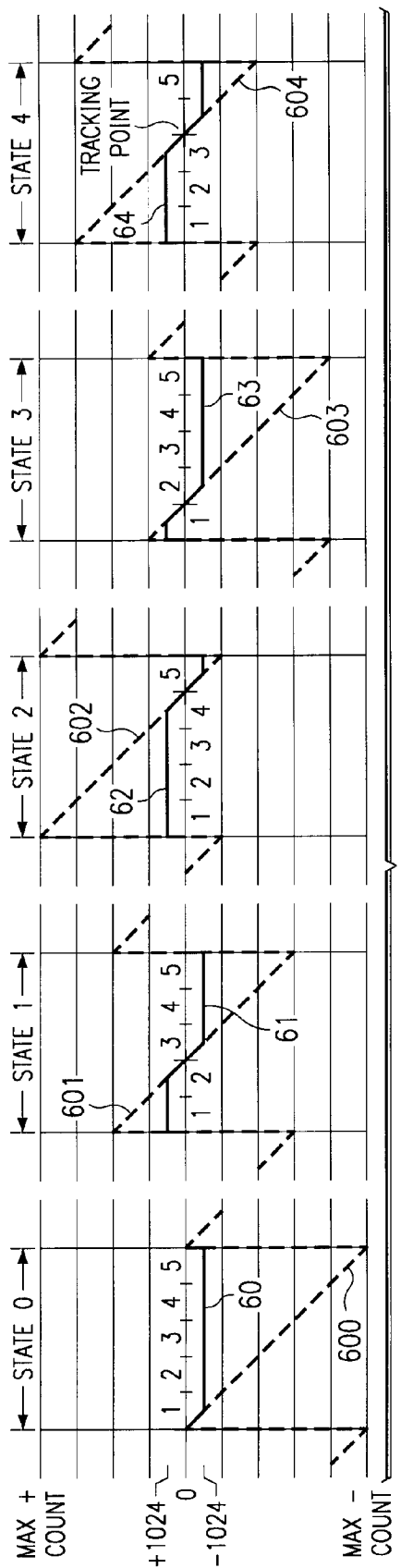
FIGS. 6a–6b are the limited discriminator curves for the color wheel's 5/2 mode of operation, showing the presence of 1 stable and 1 quasi-stable tracking point. (prior art)
Figure 7A:
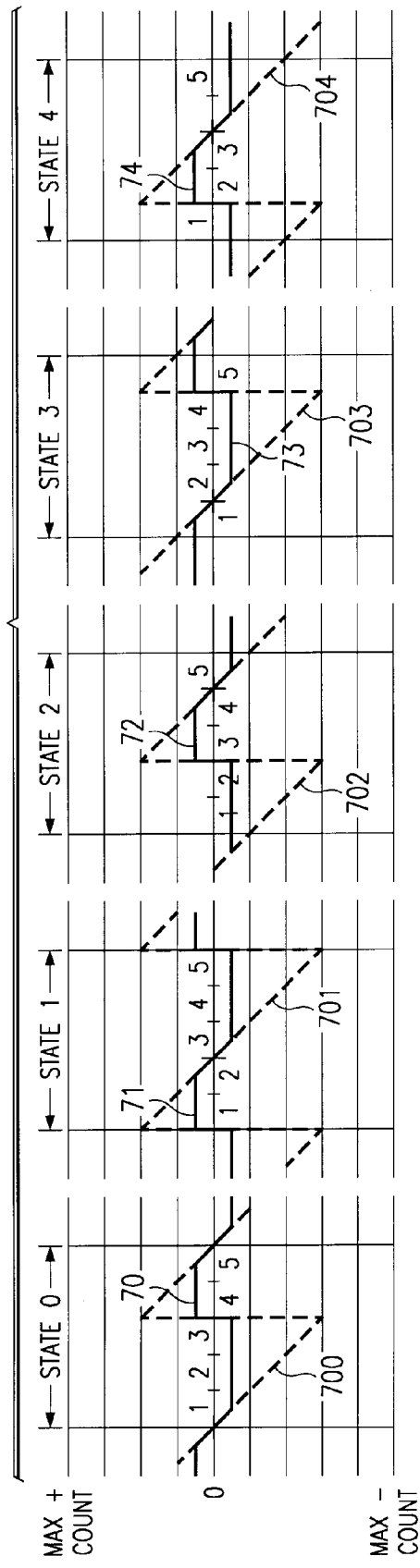
FIGS. 7a–7c are the discriminator curves for a first typical solution, which uses a previous calculated phase_error to provide a stable tracking point. (prior art)
Figure 6B:
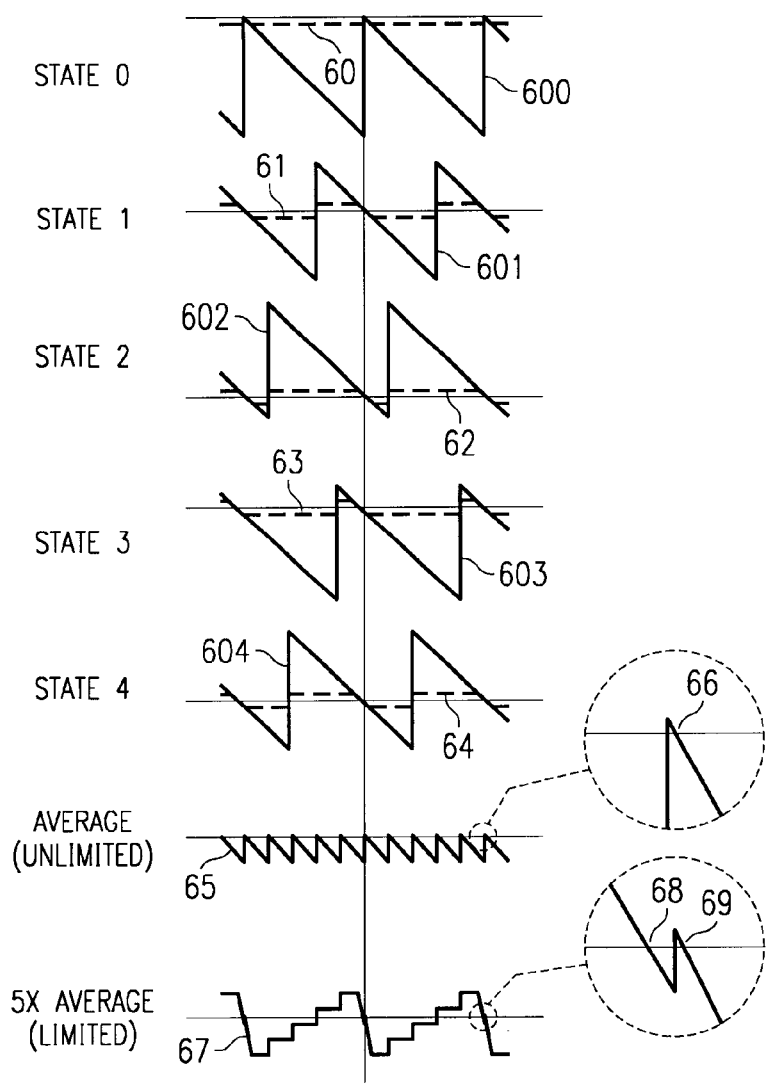
Figure 7B:
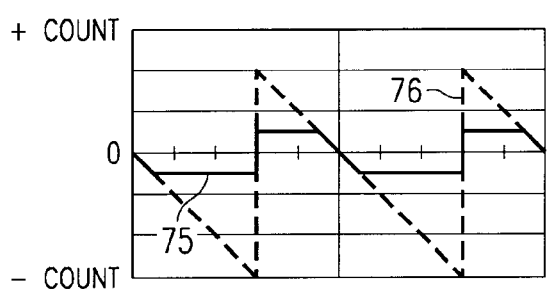
Figure 7C:
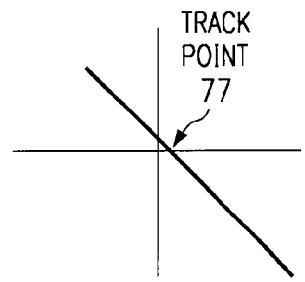
Figure 8A:
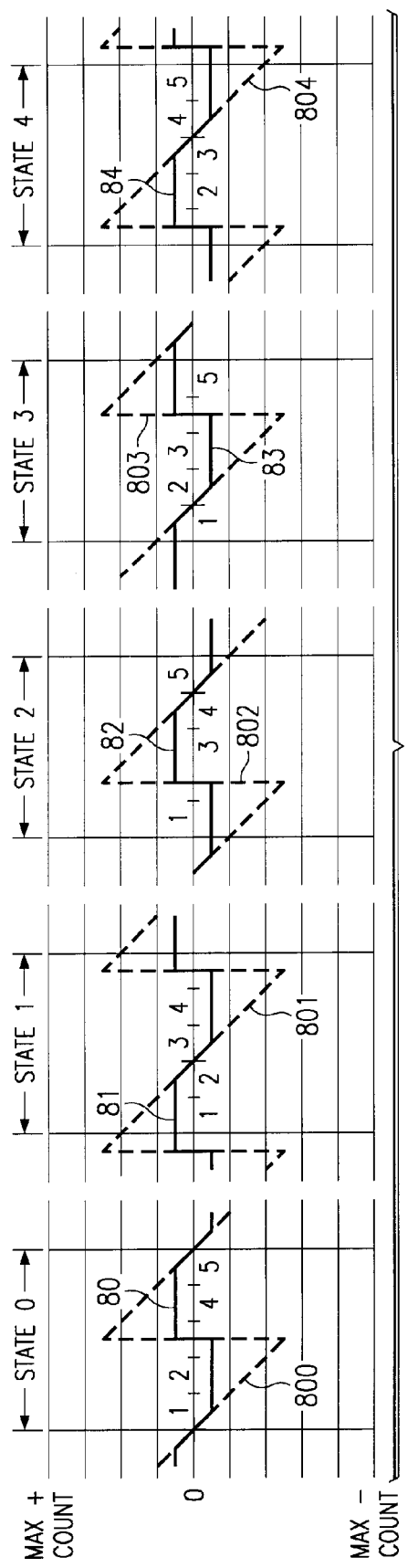
FIGS. 8a–8c are the discriminator curves for a second typical solution, where the tracking point for each index mark is in the center of the discriminator curve to provide a stable tracking point. (prior art)
Figure 8C:
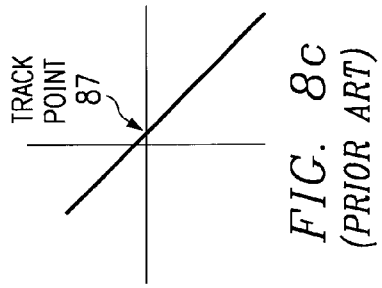
Figure 8B:
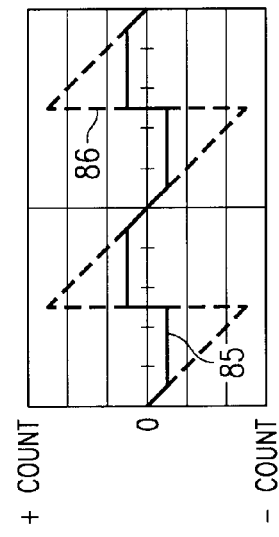

The primary requirements of this invention are to achieve initial color wheel spin-up and phase-lock in <5 seconds and channel change re-lock in <1 second for all spoke-sync modes of operation in a sequential color projection system. The new phase error method of this invention is comprised of the following steps:
1. Calculate the phase_$error$
2. Determine if loss of phase lock has occurred
3. Determine which index mark is nearest to Vsync and designate it as the primary index mark
4. Interrupt the state counter and set it so that the index mark nearest Vsync coincides with state 0
5. Re-calculate the phase error to drive the newly designated primary index mark into alignment with Vsync.

Using this approach, the color wheel will rotate no more than ± one-half revolution before phase-lock occurs and in the 5/2 and 7/2 modes, phase-lock will occur in less than ± one-quarter revolution. The complete procedure (algorithm) for phase locking the color wheel, including the new method of this invention for speeding up the process (steps 10-12), is shown below in Table 2.

TABLE 2

| | |
|---|---|
| 1. | Respond to index_interrupt |
| 2. | Update the spoke_sync_counter |
| | Increment or reset counter interval through |
| | the range 0 to num_index periods - 1 |
| 3. | Calculate desired phase offset |
| | Calculate spoke_sync_offset |
| | Add fixed_offset |
| 4. | Calculate index_Vsync difference |
| | Subtract Vsync_toa from index toa |
| 5. | calculate phase_error |
| | Subtract index_Vsync_difference from |
| | desired_phase offset |
| 6. | Correct phase_error |
| | Use conventional solutions 1 or 2 discussed |
| | in prior art |
| 7. | Limit phase error |
| | Limits are ± 4096 |
| 8. | If spoke_sync_counter ≠ 0, go to motor control |
| | loop (step 18), else |

TABLE 2-continued

| | |
|---|---|
| 9. | If phase_error is in range −1024 to +1024, go to motor control loop (step 18), else |
| 10. | Calculate num_qtr_periods of delay<br>Calculate color_wheel_period<br>Multiply index_Vsync_difference by 4 and divide result by color_wheel_period<br>Take integer part of result as num_qtr_periods |
| 11. | Calculate next_state<br>Use case statement or sub-routine to calculate next_state as a function of num_qtr_periods |
| 12. | Set spoke_sync_counter to next_state |
| 13. | Re-calculate desire_phase_offset<br>Calculate spoke_sync_offset<br>Add fixed_offset |
| 14. | Re-calculate index_Vsync_difference<br>Subtract Vsync_toa from index_toa |
| 15. | Re-calculate phase_error<br>Subtract index_Vsync_difference from desire_phase_offset |
| 16. | Re-correct phase_error<br>Use conventional solutions 1 or 2 discussed in prior art |
| 17. | Limit phase_error<br>Limits are ± 4096 |
| 18. | Execute motor control loop algorithm and return from interrupt routine. |

The sequential steps included in the algorithm of this invention, called next-step-vs.-delay method, as listed above in Table 2, are discussed below:

Step 1: Respond to Index_interrupt. At each index mark occurrence, the timer value is captured in index_toa and the processor is interrupted to perform the phase error and motor control loop algorithms. At the last Vsync occurrence, the timer value was captured in Vsync_toa and a Vsync interrupt generated to calculate and filter Vsync periods (avg_Vsync_per).

Step 2: Update spoke_sync_counter. At each color wheel index interrupt, the spoke_sync_counter gets incremented or reset over the range from 0 to the number of index periods −1. For 7/2 mode (7 index periods over 2 Vsync periods) operation the counter will increment from 0 to 6 (7−1=6). Key to this invention is that the method calculates and sets the counter to a new value when necessary in order to minimize the re-lock time. Otherwise, the incremented counter value is used.

Step 3: Calculate desired_phase_offset. This is the Vsync-to-index delay at the desired track point. The phase_offset is the spoke_sync_offset plus a fixed_offset. This fixed_offset is the minimum time between Vsync and an index mark, typically 50 $\mu$sec and in this example is the offset when the spoke_sync_counter equals zero. The spoke_sync_offset is a function of the spoke_sync_counter value and is given by Spoke_sync_offset=avg_Vsync_per*spoke_sync_counter*num_Vsync_per/num_index_per (as shown in Table 1 above).

If the spoke_sync_offset is greater than the avg_Vsync_per, then the spoke_sync_offset is found by subtracting the avg_vsync_per from this value.

Step 4: Calculate the index_Vsync_difference. This is determined by subtracting the Vsync_toa (time-of-arrival) from the index_toa. This is always a positive, unsigned, integer.

Step 5: Calculate the phase_error. This compares the desired track point with the current track point and is determined by subtracting the index_Vsync_difference from the desired_phase_offset.

Step 6: Correct the phase error. Use one of the two solutions discussed earlier in the prior art section. That is:
 1. When the calculated phase_error is beyond reasonable limits (±1024), substitute the phase error calculated from a previous index occurrence, or
 2. Recognize when the error conditions exists and correct the phase_error value by adding or subtracting the avg_Vsync_per to or from it, respectively.

Step 7: Limit_phase_error. For faster lock-up time the phase_error limit has been opened up to ±4096.

Step 8: If the spoke_sync_counter is not equal to zero, go to the motor control loop procedure (step 18) where the current phase_error is entered into the motor control loop equations. It is adequate to perform the new next-state algorithm at only one of the spoke_sync_counter states; e.g., state 0 is chosen for this example. Also, by choosing only one of the interrupts, the loop has adequate time to respond without any conflicts at the interrupt boundaries.

Step 9: If phase_error is in range ±1024, go to the motor control loop procedure (step 18). If the phase_error is within this range, then proper phase lock is assumed to exist.

Step 10: Calculate number_quarter_periods of delay. If the spoke_sync_counter is 0 and the phase_error is outside the range of >±1024, then the following method of this invention is used to re-lock the phase within ± one-half turn or less of the color wheel rotation. The procedure is to:
 1. Calculate the color_wheel_period
 2. Multiply index_sync_difference by 4 and divide result by the color_wheel_period
 3. Take the integer part of this result as the number_quarter_periods.

Step 11: Calculate the next_state. Use a case statement or sub-routine to calculate the next_state value as a function of the number_quarter_periods (see look-up tables in FIGS. 9, 10, 12).

Step 12: Set spoke_sync_counter to next_state value. Reset spoke_sync_counter to the value derived in Step 11, which will assure that state 0 occurs at the time of the index mark that is closest to Vsync.

Step 13: Re-calculate the desired_phase_offset (same process as Step 3). This is the Vsync-to-index delay at the desired track point. The phase_offset is the spoke_sync_offset plus a fixed_offset. This fixed_offset is the minimum time between Vsync and an index mark, typically 50 $\mu$sec, and in this example is the offset when the spoke_sync_counter equals zero. The spoke_sync_offset is a function of the spoke_sync_counter value and is given by Spoke_sync_offset=avg_Vsync_per*spoke_sync_counter*num_Vsync_per/num_index_per (as shown in Table 1 above).

If the spoke_sync_offset is greater than the avg_vsync_per, then the spoke_sync_offset is found by subtracting the avg_Vsync_per from this value.

Step 14: Re-calculate the index_Vsync_difference (same process as Step 4). This is determined by subtracting the Vsync_toa (time-of-arrival) from the index_toa. This is always a positive, unsigned, integer.

Step 15: Re-calculate the phase_error (same process as Step 5). This compares the desired track point with the current track point and is determined by subtracting the index_Vsync difference from the desired_phase_offset.

Step 16: Re-correct the phase error (same process as Step 6). Use one of the two solutions discussed above. That is:
 1. When the calculated phase_error is beyond reasonable limits (±1024), substitute the phase error calculated from a previous index occurrence, or 2. Recognize when the error conditions exists and correct the phase_error value by adding or subtracting the avg_Vsync_per to or from it, respectively.

Step 17: Limit_phase_error (same process as Step 7). For faster lock-up time the phase_error limit has been opened up to ±4096.

Step 18: Execute motor control loop procedure. Algorithm processes both phase and speed error values for controlling motor current to maintain phase lock.

The above method (of this invention) uses existing phase lock solutions, but implements the process very quickly, within one-half rotation phase correction of the color wheel, by resetting the spoke_sync_counter to be in state 0 at the occurrence of the index pulse nearest to Vsync. Several examples of the method of this invention are given below.

Figure 9:
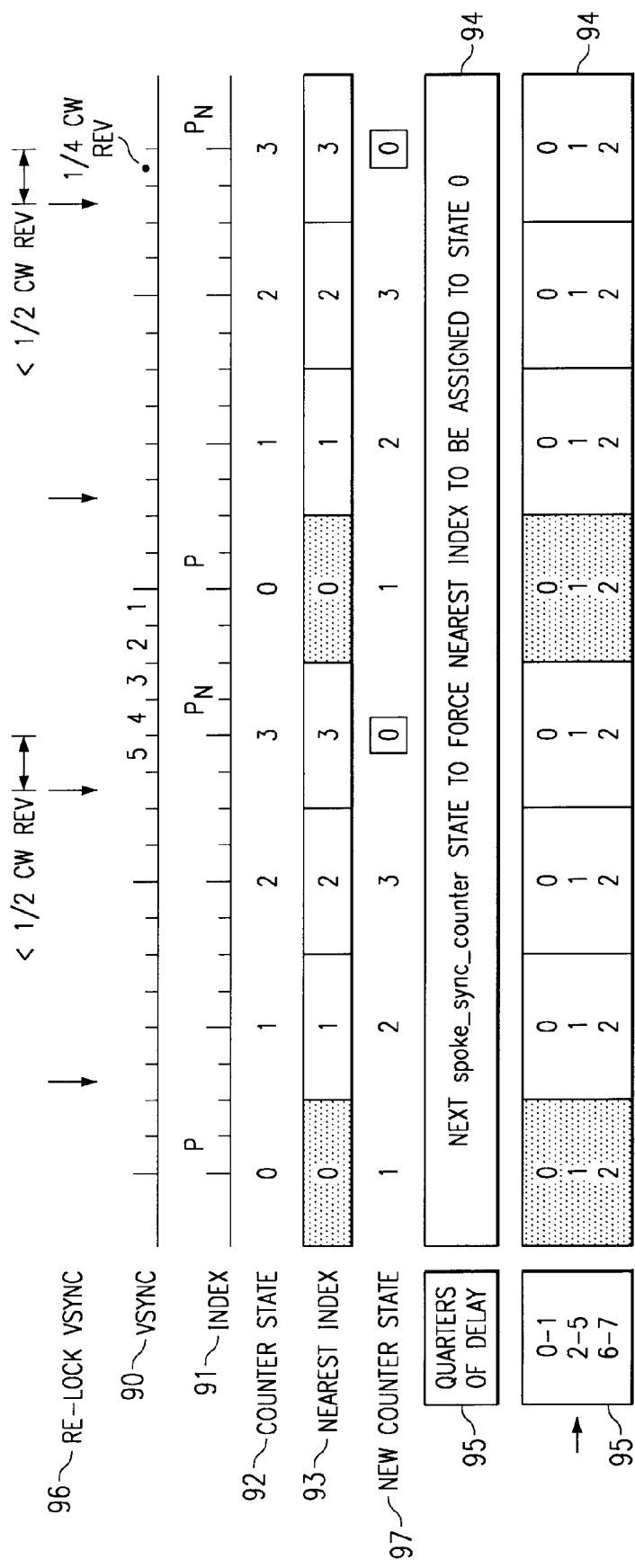
FIG. 9 illustrates the next-state-vs.-delay technique of this invention for the 4/2 mode of operation.

FIG. 9 is an example of the next-step-vs.-delay procedure of this invention for the 4/2 mode. The objective of the method is to determine a new primary index mark, which assures the quickest phase re-lock time. In this mode, when the channel is changed on the display, re-lock will occur within one-half turn of the color wheel. In this example, phase locked conditions initially exist as illustrated by the Vsync pulse 90, index pulse 91, spoke_sync_counter state 92, and the nearest index number indicator 93. There is one index mark per rotation of the color wheel and the spoke_sync_counter counts from 0 to 3 and rolls over. Also shown is a look-up table 94 giving the next spoke_sync_counter state to force the index nearest Vsync to be assigned to state 0 as a function of the number of quarter color wheel rotation delays 95. This represents a steady-state condition where the projector is phase locked and running on a selected channel. However, when a channel change occurs, the new re-lock Vsync pulse 96 will be randomly positioned relative to the original Vsync pulse 90. The method for determining the new primary index mark is as follows:

determine the number of elapsed one-quarter color wheel periods between the current index mark and the last Vsync pulse. As shown, the number of quarter color wheel periods between the original primary index mark (P), during spoke_sync_counter state 0, and the new Vsync pulse is 5 and a fraction (5+).

Then, the integer 5, representing 5 quarters of delay 95, in the look-up table 94 corresponds to the next spoke_sync-counter state to force the nearest index to be assigned to state 0, which is 1. In this method, the number_quarter_periods is calculated as follows:

num_qtr_per= integer_part[4*index_Vsync_diff/CW_per], where

CW_per=avg_Vsync_per*num_Vsync_per/num_index_per;

e.g., CW_per=8*2/4=4 and

Num_qtr_per=integer[4*5/4]=5, where index_Vsync_diff and avg_Vsync_per are in units of quarter periods.

In this example, the value from the look-up table 94 for the next spoke_sync_counter state to force the nearest index to be assigned to state 0, which corresponds to 5 quarter of delay 95, is 1. Therefore, the original counter state 0 is assigned the new counter state 97 of 1, so that the new primary index mark $P_N$ is located at the start of new counter state 0, which corresponds to the old counter state 3. As a result, in the worst case, the color wheel will re-lock at the new state 0 in $\leq$ one-half revolution of phase correction of the color wheel. In general, for all modes where the ratio of number_index_per/num_Vsync_per are even (4/2, 6/2) the maximum time to re-lock will be the time required for one-half revolution phase correction of the color wheel; e.g., 1 second maximum in this example.

Figure 10:
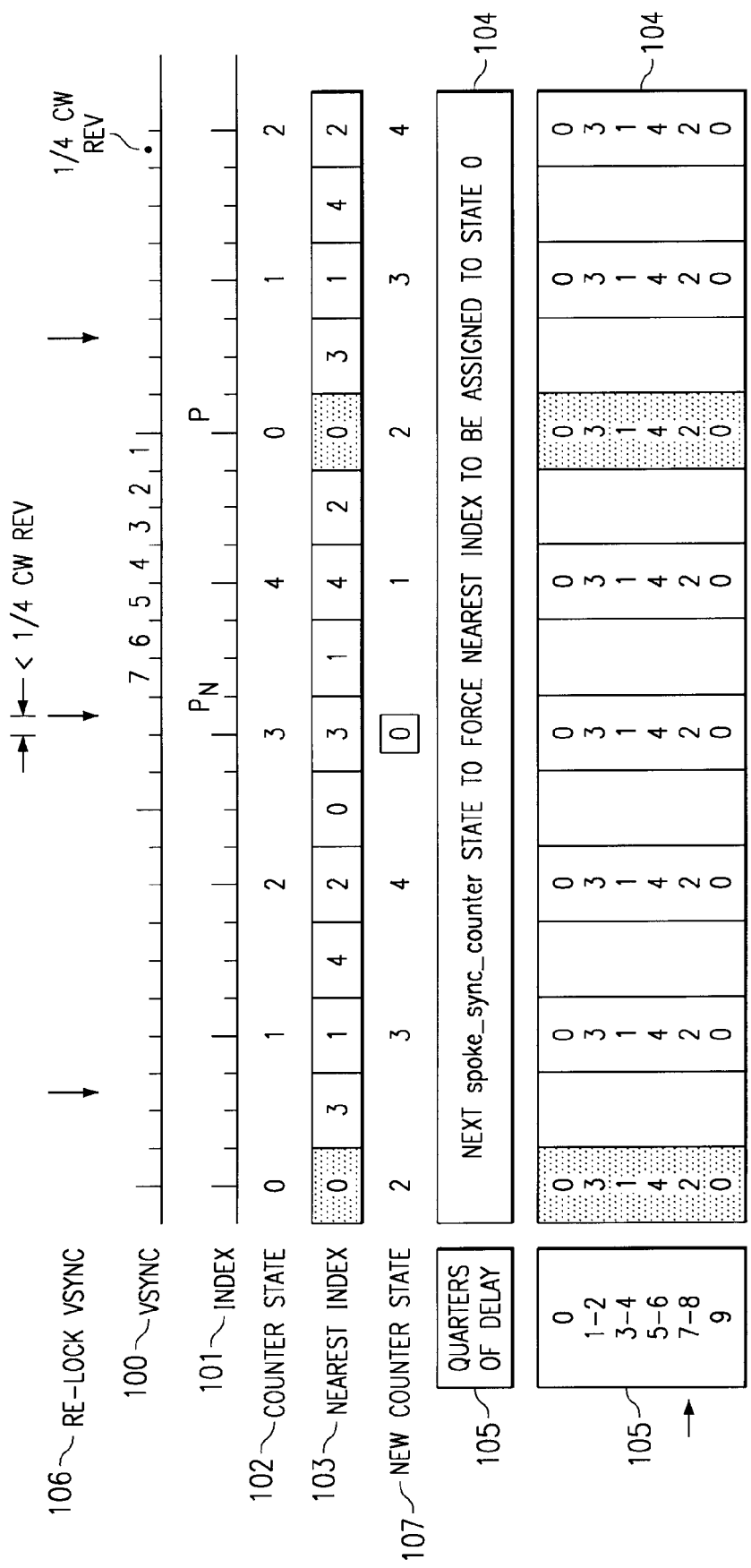
FIG. 10 illustrates the next-state-vs.-delay technique of this invention for the 5/2 mode of operation.

FIG. 10 is an example of the next-step-vs.-delay procedure for the 5/2 mode. This is similar to the 4/2 mode discussed in FIG. 9, but in this case re-lock will occur within one-quarter revolution of phase correction of the color wheel. As in the previous case, phase locked conditions exist as illustrated by the Vsync pulse 100, index pulse 101, spoke_sync_counter state 102, and the nearest index number indicator 103. In this case there is still only one index mark per rotation of the color wheel, but the spoke_sync_counter counts from 0 to 4 and rolls over. As before, the look-up table 104 gives the next spoke_sync_counter state to force the nearest index to Vsync to be assigned to state 0 as a function of number of quarter color wheel rotation delays 105. This represents the steady-state condition where the projector is phase locked and running on a selected channel. When a channel change occurs, the new re-lock Vsync pulse 106 will be randomly positioned relative to the original Vsync pulse 100. The method for determining the new primary index mark is the same as before;

determine the number of elapsed one-quarter color wheel periods between the current index mark and the last Vsync pulse. As shown, the number of quarter color wheel periods between the original primary index mark (P), during spoke_sync_counter state 0, and the new Vsync pulse is 7 and a fraction (7+). Then, the integer 7, representing 7 quarters of delay 105, in the look-up table 104 corresponds to the next spoke_sync-counter state to force the nearest index to be assigned to state 0, which is 2. As before, in the method the number_quarter_periods is calculated as follows:

num_qtr_per= integer_part[4*index_Vsync_diff/CW_per], where

CW_per=avg_Vsync_per*num_Vsync_per/num_index_per;

e.g., CW_per=10*2/5=4 and

Num_qtr_per=integer[4*7/4]=7.

In this example, the value from the look-up table 104 for the next spoke_sync_counter state to force the nearest index to Vsync to be assigned to state 0, which corresponds to 7 quarter of delay 105, is 2. Therefore, the original counter state 0 is assigned the new counter state of 2 (new counter state 107), so that the new primary index mark $P_N$ is located at the start of new counter state 0, which corresponds to the old counter state 3. As a result, in the worst case, the color wheel will re-lock at the new state 0 in $\leq$ one-quarter revolution of the color wheel. In general, for all modes where the ratio of number_index_per/num_vsync_per are odd (5/2, 7/2) the maximum time to re-lock will be the time required for a one-quarter revolution of phase correction of the color wheel.

Figure 11:
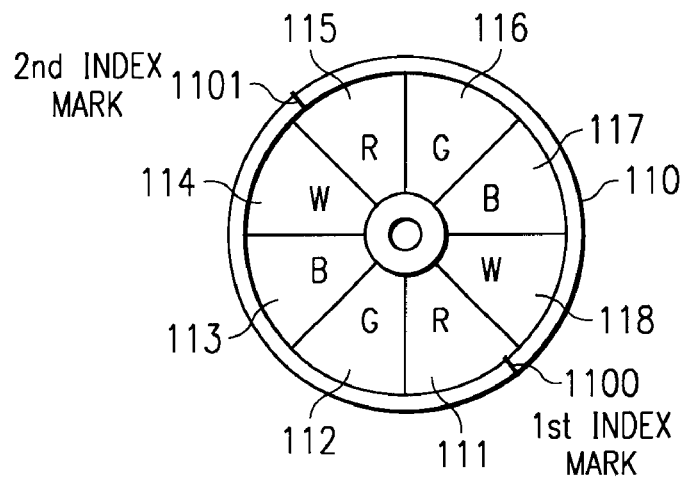
FIG. 11 is a drawing of an RGBW-RGBW color filter wheel with two index marks.

The discussion to this point has involved a color wheel that has only one index mark. However, since the color filter segments tend to be sequentially repetitive and repeat around the wheel, e.g., RGB-RGB, it is possible to speed the phase lock process up by adding multiple index marks around the periphery of the color wheel. The speed improvement is proportional to the number of index marks. FIG. 11 is a drawing of a color wheel 110, which has two sets of red 111/115, green 112/116, blue 113/117, and white (clear) 114/118 filters and two index marks 1100/1101. The white segment is sometimes added to the color wheel to improve the overall brightness of the system. In this case where two index marks are used, the phase lock time can be reduced by an additional factor of two.

Figure 12:
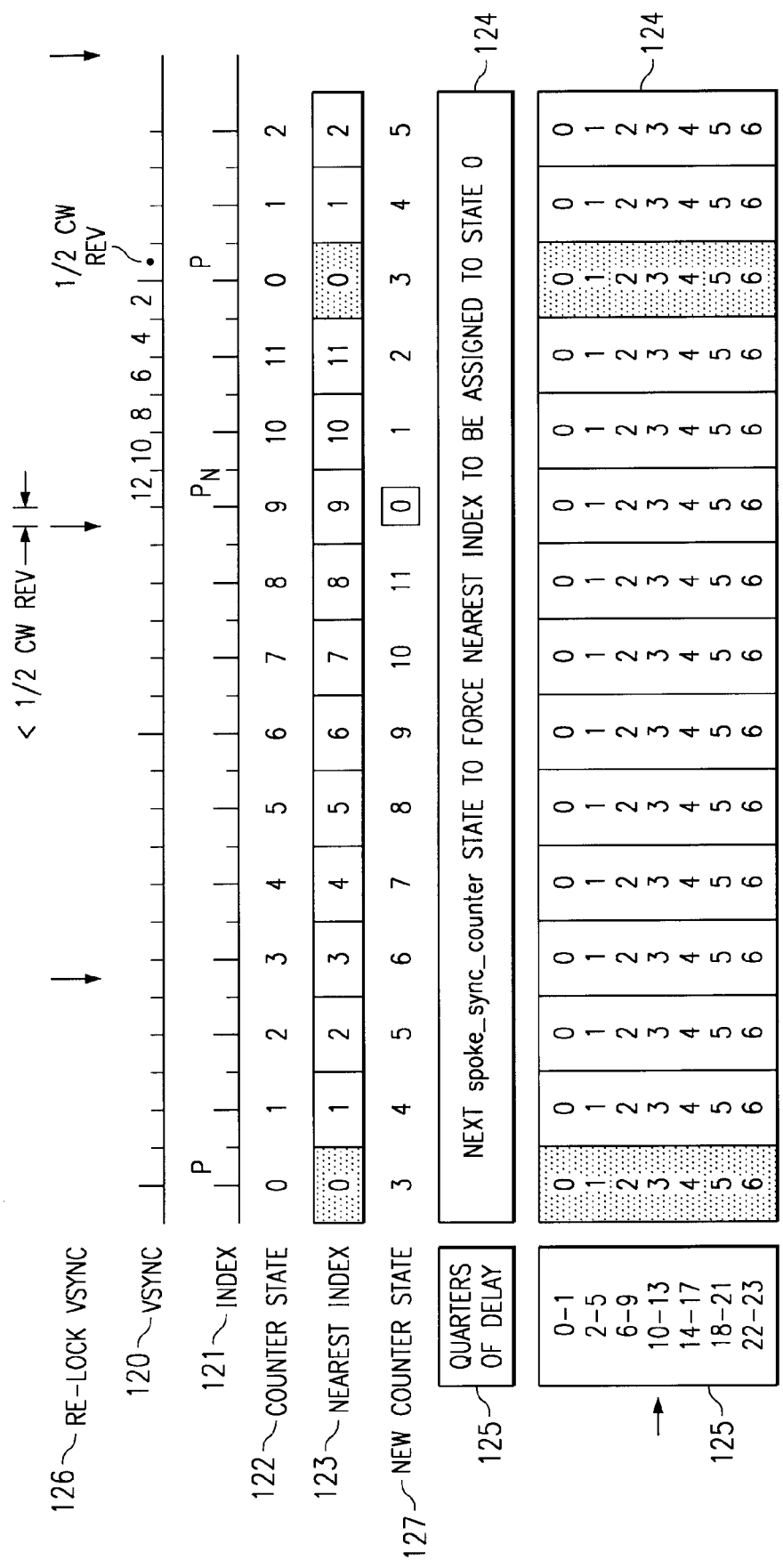
FIG. 12 illustrates the next-state-vs.-delay technique of this invention for the 12/2 mode of operation, where the color wheel has two index marks.

FIG. 12 is an example of the next-step-vs.-delay procedure for the 12/2 mode, which uses a color wheel with two index marks, as shown in FIG. 11. This chart is similar to the earlier ones, but here each small division on the Vsync pulse 120 represents one-half revolution of the color wheel, although the method still deciphers based on quarter turns of the color wheel. As in the previous case, phase locked conditions exist as illustrated by the Vsync pulse 120, index pulse 121, spoke_sync_counter state 122, and the nearest index number indicator 123. As indicated, now there are two index marks per rotation of the color wheel and the spoke_sync_counter counts from 0 to 11 and rolls over. The look-up table 124 gives the next spoke_sync_counter state to force the nearest index to be assigned to state 0 as a function of number of quarter color wheel rotation delays 125. This represents the steady-state condition where the projector is phase locked and running on a selected channel. When a channel change occurs, the new re-lock Vsync pulse 126 will be randomly positioned relative to the original Vsync pulse 120. The method for determining the new primary index mark is the same as before;

determine the number of elapsed one-quarter color wheel periods between the current index mark and the last Vsync pulse. As shown, the number of quarter color wheel periods between the original primary index mark (P), during spoke_sync_counter state 0, and the new Vsync pulse is 12 and a fraction (12+). Then, the integer 12, representing 12 quarters of delay 125, in the look-up table 124 corresponds to the next spoke_sync-counter state to force the nearest index to Vsync to be assigned to state 0, which is 3. As before, in this method the number_quarter_periods is calculated as follows: (times in seconds)

num_qtr_per= integer_part[4*index_Vsync_diff/CW_per], where

CW_per=avg_Vsync_per*num_Vsync_per/num_index_per;

e.g., CW_per=24*2/12=4 and

Num$_{qtr}$_per=integer[(4*12/4)]=12.

In this example, the value from the look-up table 124 for the next spoke_sync_counter state to force the nearest index to Vsync to be assigned to state 0, which corresponds to 12 quarter of delay 125, which is 3. Therefore, the original counter state 0 is assigned the new counter state of 3 (new counter state 127), so that the new primary index mark $P_N$ is located at the start of new counter state 0, which corresponds to the old counter state 9. As a result, in the worst case, the color wheel will re-lock at the new state 0 in ≦one-quarter revolution of phase correction of the color wheel.

Figure 13:
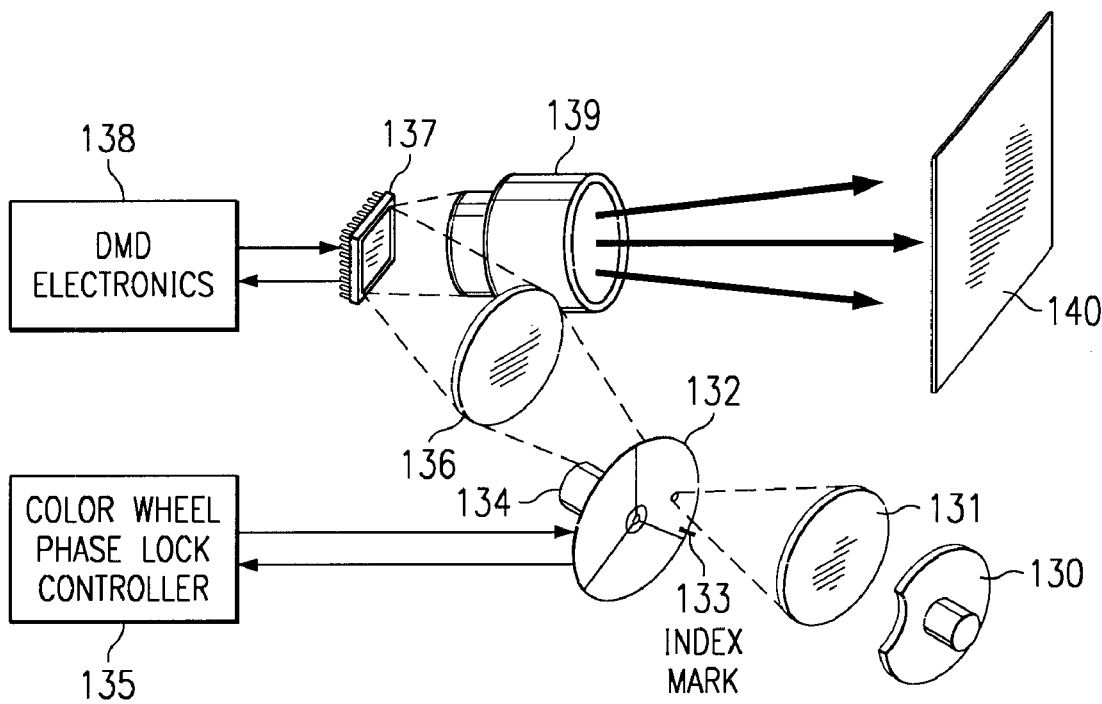
FIG. 13 is a block diagram for a single-micromirror color field-sequential projector, which uses the color wheel phase_error correction improvements of this invention.

FIG. 13 is a block diagram of a single micromirror projection display system, comprised of a light source 130, a first condenser lens 131, a rotating color wheel (with RGB-RGB or RGBW-RGBW filter sequence) 132 and index mark(s) 133, a motor 134, the color wheel phase lock loop controller of this invention 135, a second condenser lens 136, a single micromirror 137, electronics 138, a fixed or zoom projection lens 139, and a viewing screen 140. The micromirror operates in the color field-sequential mode, whereby red-green-blue-optional white light is sequentially generated from a white light source 130, by means of the color filter segmented rotating wheel 132 and applied to the array of mirrors on the surface of the micromirror 137. This configuration operates the micromirror 137 at high speeds, 0.93 mSec per color segment, in order to sequentially read in the 18 (red, green, and blue) segments in a single TV field time of 16.7 msec. The phase lock methods of this invention improves the projector initial spin-up time to ≦5 sec and the channel change re-lock time to ≦1 sec.

The color wheel controller and method described herein improves the re-lock performance of the display system by detecting when the color wheel loses lock and rapidly re-locking the color wheel. This is accomplished by measuring a difference between a synchronization signal, typically the Vsync signal, and an index signal to which the synchronization signal is locked. The index signal typically is derived from the position of the color wheel and occurs at least twice each synchronization signal period. The difference signal is compared to a certain threshold. When the difference exceeds the threshold, the controller determines which index signal is the nearest to the synchronization signal an re-locks the nearest index signal to the synchronization signal.

While this invention has been described in the context of a preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A method of phase locking a color wheel, the method comprising:
   detecting an arrival of a primary index mark and a reference signal;
   calculating a phase error of said primary index mark arrival relative to said reference signal arrival;
   replacing said primary index mark with a new primary index mark to minimize said phase error when said phase error exceeds a predetermined limit; and
   driving said color wheel to align said new primary index mark with said reference signal.

2. The method of claim 1, comprising:
   resetting a state counter when said primary index mark is replaced.

3. The method of claim 1, said detecting an arrival of a primary index mark and a reference signal comprising:
   detecting an arrival of a primary one of two index marks on said color wheel, said color wheel having two sets of color filters.

4. The method of claim 1, said replacing said primary index mark with a new primary index mark to minimize said phase error when said phase error exceeds a predetermined limit comprising:

replacing said primary index mark when said phase error exceeds one-quarter revolution of said color wheel.

5. The method of claim 1, said replacing comprising:

calculating a number of quarter periods of delay; and using a look-up table or sub-routine to find a next state counter state to force said nearest index mark to be assigned state 0.

6. The method of claim 5, said calculating the number of quarter periods of delay comprising:

calculating a color wheel period;

multiplying an arrival difference between said primary index mark and said reference signal by 4 and dividing by said color wheel period to derive a result; and taking an integer part of said result as said number of quarter periods of delay.

7. A method of phase-locking a color wheel, the method comprising:

responding to an index signal;

updating a spoke_sync_counter state counter, said spoke_sync_counter incrementing each index signal received between occurrences of a Vsync reference signal;

calculating a timing difference between said index and said Vsync reference signal;

determining which index mark is nearest the Vsync reference signal on one or more of the spoke_sync_counter states when said timing difference exceeds a predetermined threshold and designating said nearest index mark as a primary index mark; and setting said spoke_sync_counter to a new state that forces said nearest index mark to be assigned to state 0.

8. The method of claim 7, said determining comprising:

calculating a number of quarter periods of delay; and using a look-up table or sub-routine to find a next spoke_sync_counter state to force said nearest index mark to be assigned state 0.

9. The method of claim 8, said calculating the number of quarter periods of delay comprising:

calculating a color wheel period;

multiplying said timing difference by 4 and dividing by said color wheel period to derive a result; and taking an integer part of said result as said number of quarter periods of delay.

10. The method of claim 7, said responding to an index signal comprising:

detecting an arrival of a primary one of two index marks on said color wheel, said color wheel having two sets of color filters.

11. The method of claim 7, wherein said predetermined threshold is one-quarter revolution of said color wheel.

12. A method of phase locking a color wheel to a synchronization signal, the color wheel having an index mark, the method comprising:

detecting the synchronization signal, wherein the synchronization signal has a periodic synchronization pulse;

generating a periodic index signal representative of a rotation of the index mark, wherein there are at least two periodic index pulses during a synchronization signal period, and wherein a first one of the index pulses is designated as a primary index pulse;

determining a phase error between the primary index pulse and the synchronization pulse;

selecting a nearest index pulse nearest the synchronization pulse when the phase error exceeds a predetermined threshold, wherein the nearest index pulse is different from the first one of the index pulses;

re-designating the nearest index pulse as the primary index pulse; and driving the color wheel to phase lock the primary index pulse with the synchronization pulse.

13. The method of claim 12, further comprising updating a state counter at each index pulse, wherein the state counter has a primary state associated with the primary index pulse.

14. The method of claim 13, further comprising changing the state counter to a new state when the nearest index pulse is re-designated as the primary index pulse.

15. The method of claim 14, wherein the new state is set so that the primary state occurs at the time of the nearest index pulse.

16. The method of claim 12, wherein the color wheel has two index marks and two sets of color filters.

17. The method of claim 12, further comprising performing a correction of the phase error after the determining the phase error.

18. The method of claim 17, further comprising:

recalculating the phase error after the re-designating the nearest index pulse as the primary index pulse; and performing a re-correction of the phase error after the recalculating the phase error.

19. The method of claim 12, further comprising recalculating the phase error after the re-designating the nearest index pulse as the primary index pulse.

20. The method of claim 19, further comprising performing a correction of the phase error after the recalculating the phase error.

* * * * *